UNITED STATES PATENT OFFICE.

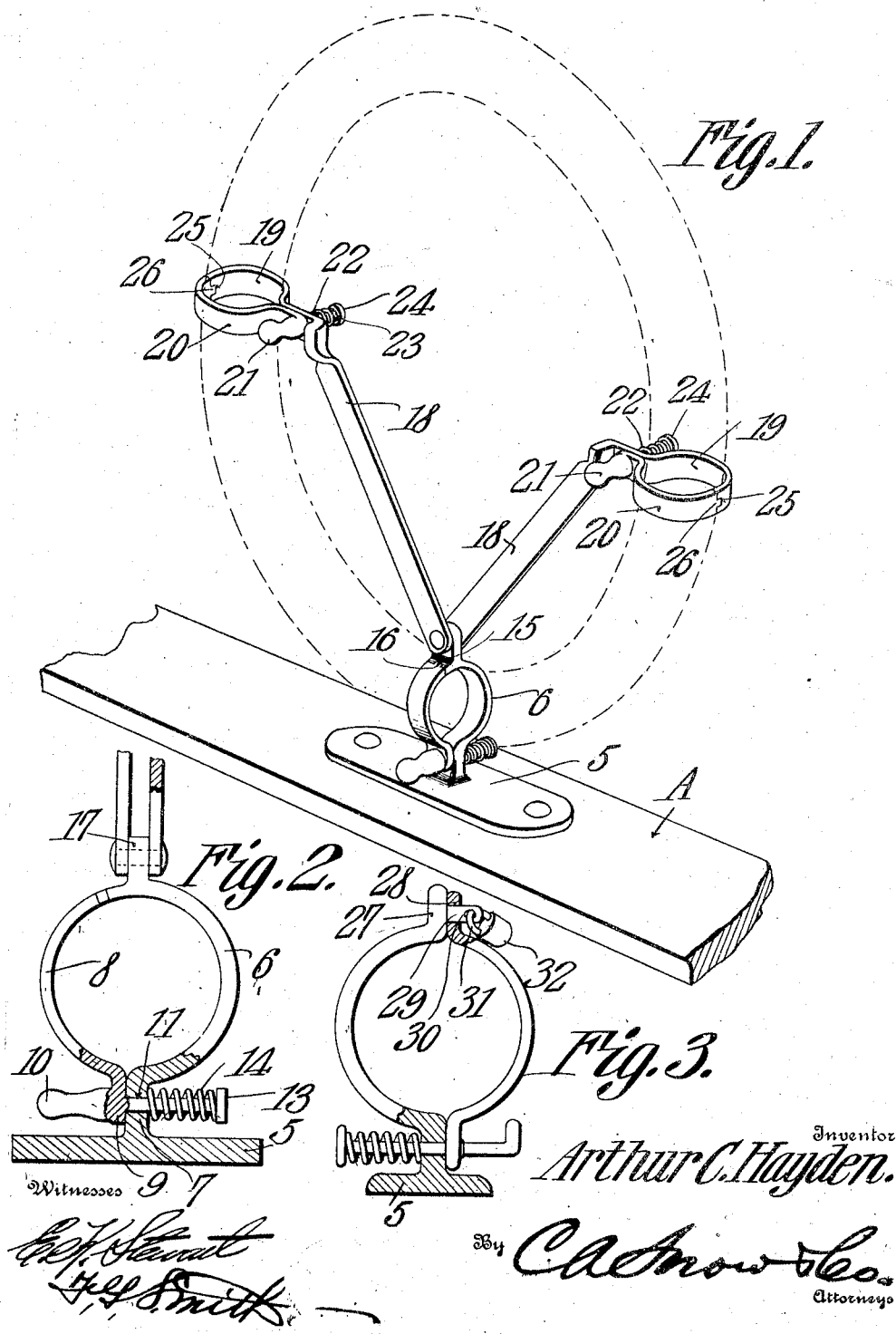

ARTHUR C. HAYDEN, OF BROCKTON, MASSACHUSETTS.

TIRE-SUPPORT.

976,736. Specification of Letters Patent. Patented Nov. 22, 1910.

Application filed May 15, 1909. Serial No. 496,116.

*To all whom it may concern:*

Be it known that I, ARTHUR C. HAYDEN, a citizen of the United States, residing at Brockton, in the county of Plymouth and State of Massachusetts, have invented a new and useful Tire-Support, of which the following is a specification.

It is the object of the present invention to provide an improved construction of tire supporting device and the invention relates more particularly to that class of such devices which are supported on the vehicle upon the wheels of which the tire is to be used.

More specifically speaking, the invention relates to a tire supporting device such as is mounted upon the running board of an automobile for the purpose of supporting an extra automobile tire which is to be placed upon one of the wheels in event of damage to one of the tires already in place.

The invention aims primarily to provide a device of this class so constructed as to permit of a tire being readily and quickly placed thereon in position to be supported thereby and as readily removable. It is customary, ordinarily, to secure the tires in place by means of straps and buckles but such means presents, first, the disadvantage of being insecure and liable to soon become so worn as to be unfit for use and further to require considerable time for the removal of the tire. The invention therefore aims to provide a device of this class so constructed as to permit of practically instantaneous removal of the tire or its disposal upon the device and also to firmly hold the tire when disposed thereon.

It is a further aim of the invention to provide such a device so constructed as to adapt it for use in supporting tires of various diameters whereby the same device may be employed in supporting tires for the front or the rear wheels of the automobile and in this connection it is contemplated that this adaptation of the device to tires of various diameters be had without the employment of adjusting devices.

In the accompanying drawings, Figure 1 is a perspective view of the tire supporting device embodying the present invention, the same being shown in place upon the running board of an automobile. Fig. 2 is a view partly in elevation and partly in section of the intermediate one of the tire clamping members of the device, and Fig. 3 is a view similar to Fig. 2 but showing a slight modification of the invention, this modification being embodied in one of the end ones of the clamping members of the device.

In the drawings, there is shown a portion of the running board of an automobile, indicated by the reference character A, the tire supporting device embodying the present invention being mounted upon this running board. It will be understood however that should it be found expedient to support the device upon any other portion of the vehicle, this may be done without materially altering the device and without departing from the spirit of the invention.

The device includes a base or attaching plate which is indicated by the numeral 5 and integral with which is one section of one of the tire clamping members, this being the intermediate one of the several members. This section of the intermediate tire clamping member is indicated by the numeral 6 and is substantially semi-annular, it being so relatively positioned with respect to the base plate 5 as to have one end located in a plane above the other, the entire section being positioned in a vertical plane and the lower end of the section is connected with the base plate 5 by a shank portion 7. The other section of the tire clamping member now being described is indicated by the numeral 8 and is also substantially semi-annular, it being arranged, as will be presently explained, to have its upper end coöperate with the upper end of the section 6 and is provided at its lower end with a downwardly directed portion 9 with or upon which is formed or provided a handle 10. This handle 10 just mentioned projects outwardly from the downwardly directed portion 9 of the section 8 from one side thereof and projecting inwardly from the said section; and through an opening 11 formed through the shank portion 7 of the section 6 is a stem 12 having at its end a head 13 against which bears one end of a spring 14 which is disposed upon the stem, the other end of this spring seating against the said shank portion 7 of the section 6.

From the foregoing it will be readily understood that the spring 14 normally holds the downwardly directed portion 9 of the section 8 against the shank portion 7 of the section 6 in the relation shown in Figs. 1 and 2 of the drawings and that when the section 8 is in the same vertical plane with the section 6, its upper end will coöperate with the upper end of the said section as before mentioned. Furthermore, as will be readily understood, the section 8 of the tire clamping member may be turned to one side or the other upon the stem 12 as a pivot so that its upper end may be moved out of position for coöperation with the upper end of the section 6 whereby to permit of the introduction of a tire into the concavity of the section 6 in position to be clamped between the two sections when the section 8 is returned to normal position. This return of the section 8 to normal position is had by grasping the handle 10, pulling outwardly upon the said handle whereby to compress the spring 14 and move the section 8 away from the section 6, and then swinging the section 8, by means of the handle 10, until its upper end comes opposite the upper end of the section 6 whereupon the handle is released and the spring 14 quickly moves the section 8 into clamping engagement with the tire and with its upper end in coöperative engagement with the upper end of the section 6. In order to prevent accidental angular displacement of the section 8 with respect to the section 6 so that the coöperating upper ends of the sections would be out of engagement, the upper end of the section 6, or it may be the upper end of the section 8, is formed with a notch 15 in which seats a lug 16 formed at the upper end of the other section of the tire clamping member.

The section 6 of the intermediate tire clamping member just described is formed adjacent its other end with an upstanding ear 17 to which are pivoted the lower ends of arms 18. The arms 18 are preferably of right line extent and at their upper ends are provided with angularly disposed tire clamping members which are similar to the members above described. As in the case of the first described tire clamping member, these last mentioned members are comprised each of a fixed and a movable section and of these sections the fixed section is indicated by the numeral 19 it being preferably integral with one of the arms 18 and disposed angularly with respect to the said arms. The movable section is indicated by the numeral 20 and is provided at its inner end with a handle 21 similar to the handle 10 and with a stem 22 which projects through an opening formed in the shank portion of the section 19, there being a spring 23 disposed upon this stem and bearing against a head 24 at the end thereof and also against the said shank portion of the section 19, whereby the section 20 will be held with its outer end in coöperative engagement with the outer end of the section 19, the said end of the section 19 being formed with a notch 25 and the coöperating end of the section 20 with a lug 26 which engages in the notch when the said ends of the sections are in coöperative relation and serves to prevent up or down displacement of the section 20 with respect to the section 19.

From the foregoing description of the invention it will be readily understood that prior to the disposal of a tire upon the supporting device above described, the handles 21 of all of the tire clamping members are rotated to angularly displace the movable sections of the tire clamping members with respect to the fixed sections thereof. After the tire has been properly disposed in the concavities of the fixed sections of all of the clamping members, a pull is exerted upon each of the handles 21 and the movable clamping sections are swung to position to bring their outer ends into coöperative engagement with the corresponding ends of the related fixed sections whereupon the sections will encircle the tire and firmly hold the same against displacement or removal.

In the form of the invention shown in Fig. 3 of the drawings, the outer or coöperating ends of the two sections of the tire clamping member, instead of being formed with the notch and the other with the lug as above described, are bent to extend radially as indicated by the numeral 27, the radially bent portion of one section being formed with an opening 28 and the said portion of the other section with a stud 29 which engages through this opening 28 when the sections are in position to have their ends coöperate. The stud 29 is formed with an opening 30 at its outer end for the passage of the bail 31 of a lock 32 employed for the purpose of locking the sections against being moved to position to release the tire by unauthorized parties.

It will further be observed from an inspection of the drawings that inasmuch as the arms 18 are pivotally mounted and may assume various angular positions with respect to the clamping member 6, and the clamping members upon the arms are angularly disposed with respect to the arms, the device is adapted for use in supporting tires of various diameters, the angular relation of the terminal tire clamping members with respect to the intermediate tire clamping member varying upon swinging of the arms 18 upon their pivots.

What is claimed is:—

1. In a device of the class described, a supporting arm, and tire clamping means at the end of the arm, said means comprising a fixed tire clamping member and a movable tire clamping member, said movable member having a stem projecting through a portion of the fixed member and a spring upon the stem tending normally to hold the movable member in coöperative relation with respect to the fixed member, said movable member being movable away from the fixed member in the plane thereof and being movable upon the stem as a pivot to lie at an angle to such plane.

2. In a device of the class described, a supporting arm, and tire clamping means at the end of the arm, said means comprising a fixed tire clamping member and a movable tire clamping member, said movable member having a stem projecting through a portion of the fixed member, a spring upon the stem tending normally to hold the movable member in coöperative relation with respect to the fixed member, and a handle projecting from the movable member in alinement with the stem, said movable member being movable away from the fixed member in the plane thereof and being movable upon the stem as a pivot to lie at an angle to such plane.

3. In a device of the class described, a supporting arm, a tire clamping means at the end of the arm, said means comprising a fixed tire clamping member and a movable tire clamping member, each of said members being substantially semi-annular, said movable member having a stem projecting through a portion of the fixed member, and a spring tending normally to hold the movable member in coöperative relation with respect to the fixed member, said movable member being movable away from the fixed member in the plane thereof, and being movable upon the stem as a pivot to lie at an angle to such plane, the said members being arranged for mutual engagement at their coöperating ends in such manner as to normally prevent movement of the movable member upon the stem as a pivot.

4. In a device of the class described, a supporting arm, a tire clamping means at the end of the arm, said means comprising a fixed tire clamping member and a movable tire clamping member, said movable member having a stem projecting through a portion of the fixed member, and a spring upon the stem tending normally to hold the movable member in coöperative relation with respect to the fixed member, said movable member being movable away from the fixed member in the plane thereof, and being movable upon the stem as a pivot to lie at an angle to such plane, one of the members being formed at one end with a notch and the other member being formed with a lug seating in the notch when the ends of the two members are in coöperative engagement, the engagement of the lug in the notch serving to prevent movement of the movable member upon the stem as a pivot.

In testimony that I claim the foregoing as my own, I have hereto affixed my signature in the presence of two witnesses.

ARTHUR C. HAYDEN.

Witnesses:
  E. HUME TALBERT,
  F. T. CHAPMAN.